Dec. 1, 1953  T. O. STRAUSS  2,660,799
LATHE ATTACHMENT
Filed June 16, 1947  3 Sheets-Sheet 1
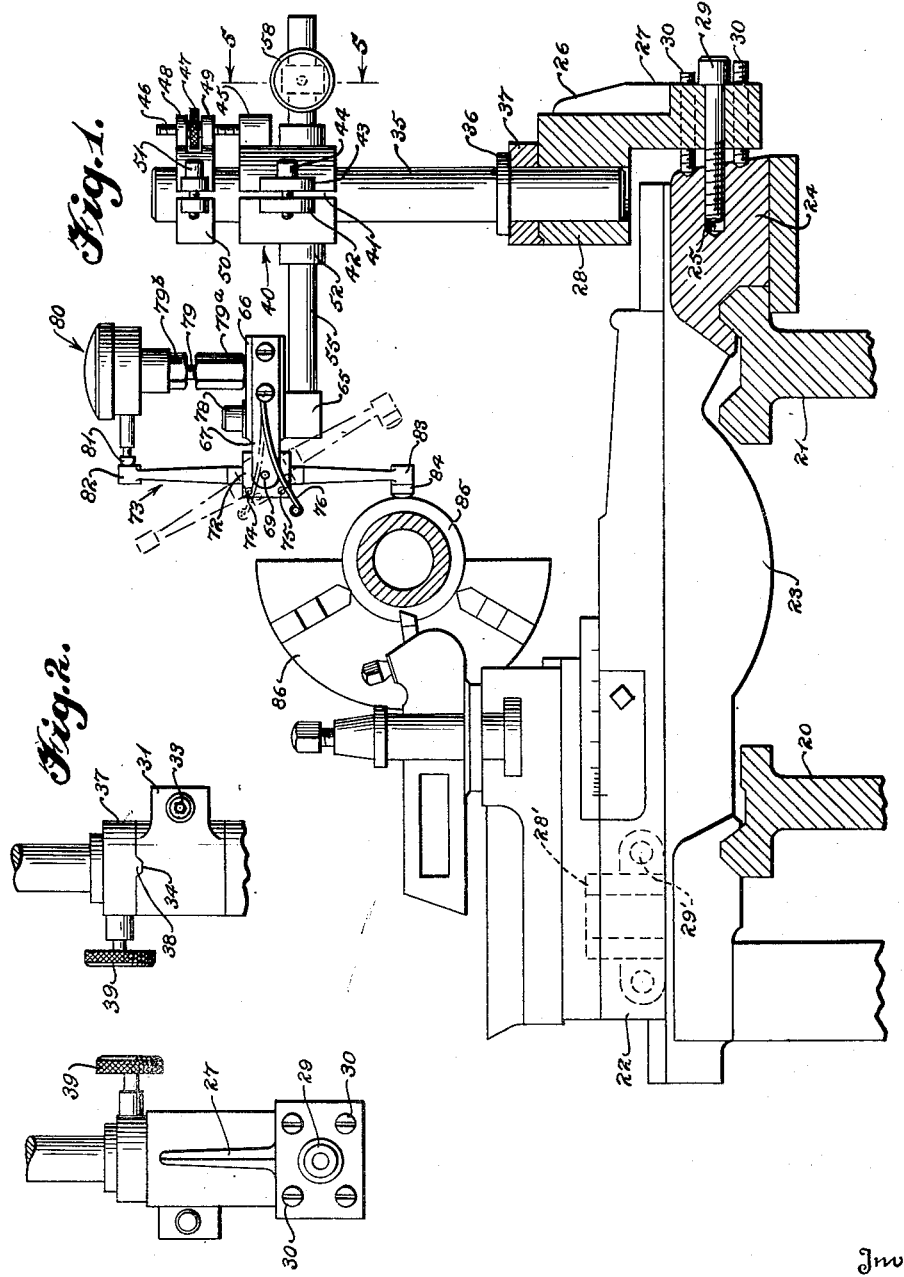
Inventor
Theodore O. Strauss
By Cushman Darby Cushman
Attorney

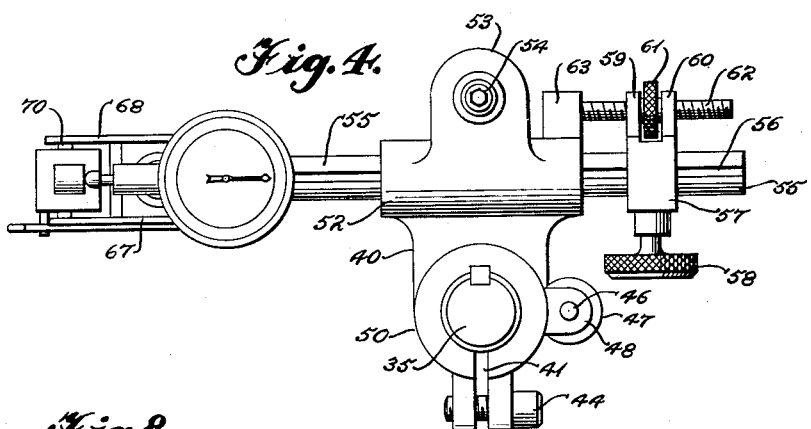
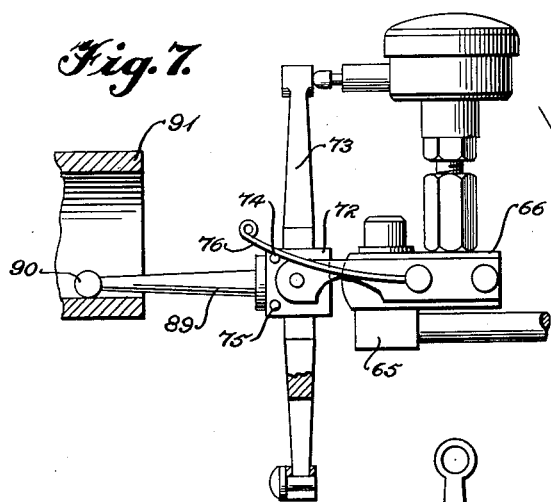
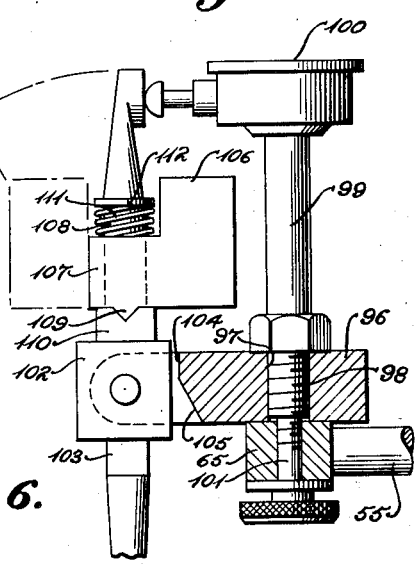
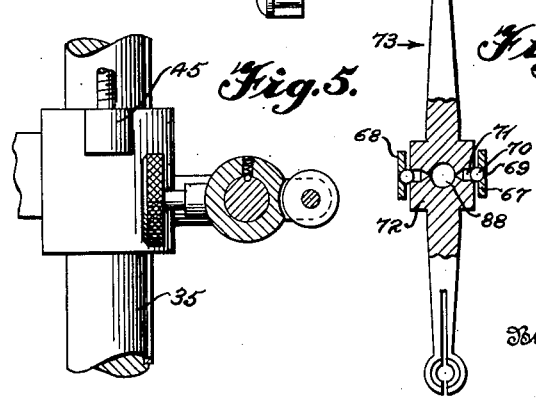

Dec. 1, 1953 — T. O. STRAUSS — 2,660,799
LATHE ATTACHMENT
Filed June 16, 1947 — 3 Sheets-Sheet 3
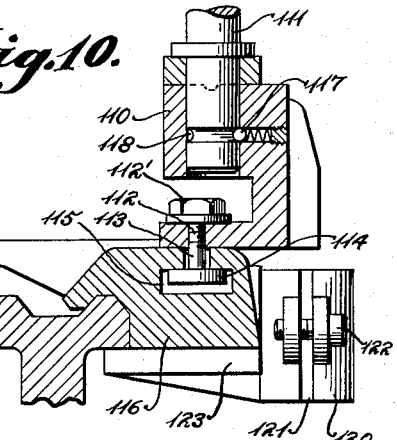
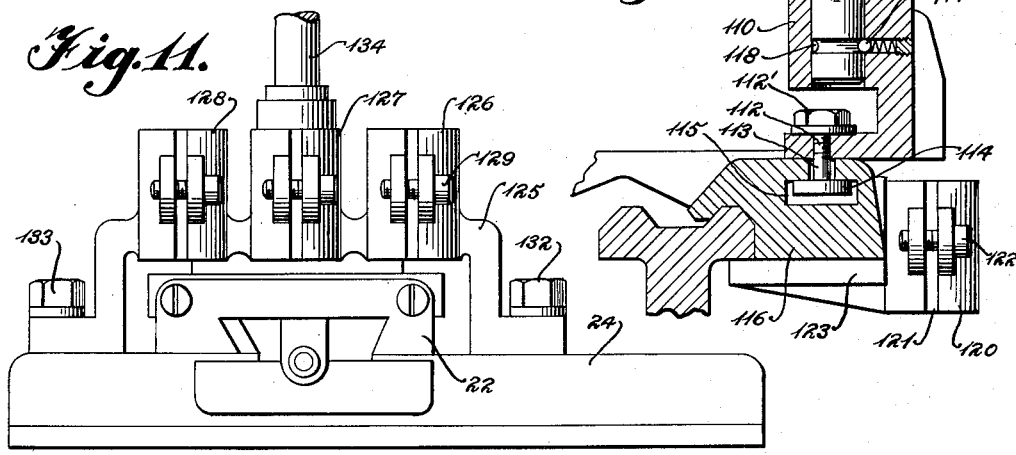
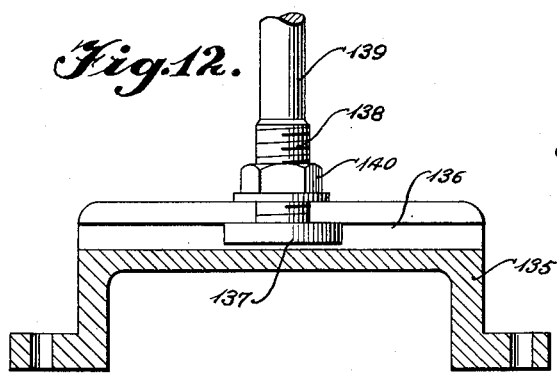
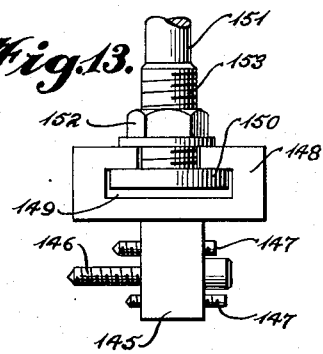
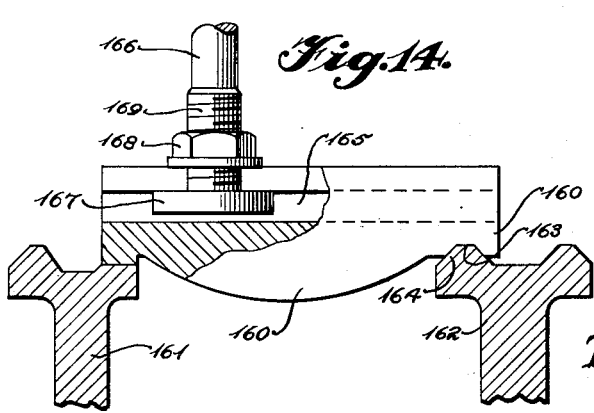
Inventor
Theodore O. Strauss Patented Dec. 1, 1953

2,660,799

UNITED STATES PATENT OFFICE 2,660,799

LATHE ATTACHMENT

Theodore O. Strauss, New York, N. Y.

Application June 16, 1947, Serial No. 754,978

3 Claims. (Cl. 33—172)

In the conventional operation of a lathe, a micrometer or gauge is used for measuring the work. The machine is stopped, the micrometer has to be applied to a precise position, and the operator has to take the reading and calculate how much more metal has to be taken off, these operations taking considerable time during which the machine is idle. The object of the present invention is to provide measuring apparatus applicable to lathes, grinding machines, milling machines, etc., enabling measurements to be quickly made without stopping the machine. Another object is to provide apparatus which will handle other operations, for example, the axial and transverse indicating of work pieces to determine concentric, eccentric, parallel or out-of-round conditions and to set the machine for accurate tapers.

The machine is shown in illustrative embodiment in the accompanying drawings, in which Figure 1 is a transverse section of a lathe with the carriage in elevation and equipped with the new apparatus;

Figure 2 is a partial elevation of the base portion of the new apparatus, which portion appears in transverse section in Figure 1;

Figure 3 is an elevation of the base portion of the apparatus as seen from the right of Figure 1;

Figure 4 is a plan view of the apparatus;

Figure 5 is a section substantially on line 5—5 of Figure 1;

Figure 6 is an elevation and partial section of a contacting lever;

Figure 7 is a partial elevation of the apparatus arranged for inside contact;

Figure 8 shows in elevation a contact finger, which is a modification of that shown in Figure 7;

Figure 9 shows a modification partly in elevation and partly in section;

Figure 10 shows a modified base structure in vertical section;

Figure 11 is a rear elevation of a lathe carriage showing a further modified cross-slide base structure;

Figure 12 is a vertical section of a modified supporting bridge;

Figure 13 shows a further form of mounting means in elevation, and

Figure 14 is a transverse section of a lathe bed showing a special form of saddle partly in elevation and partly in section.

In Figure 1, reference numerals 20 and 21 designate the ways of a lathe having a cross-slide 22 mounted upon a saddle 23. The rear longitudinal portion 24 of the saddle is provided with a horizontal threaded bore 25.

Reference numeral 26 designates a bracket having a shank portion 27 for a vertical socket portion 28. The shank is bored to pass a holding screw 29 which is threaded into bore 25. Four parallel bores are arranged around screw 29 and have threaded therein trueing screws 30 which engage the rear face of saddle portion 24 so that the bracket is rigidly secured to the saddle with the socket exactly vertical. The socket has a vertical split at one side with integral ears 31 and 32 adapted to be pulled together by a screw 33. The upper end face of the socket portion 28 is provided with a diametrical groove 34 having downwardly tapering or converging side walls.

Reference numeral 35 designates a pedestal or post whose lower end is closely received in the socket portion 28, the pedestal having an integral flange 36 which rests on a collar 37 having a rib 38 mating with the groove 34, the collar being equipped with a radial screw 39 by means of which the pedestal may be locked in desired angular relation with respect to the collar.

Splined on pedestal 35 is a bracket 40 having a vertical split 41 with ears 42 and 43 at the sides thereof and connected by a clamping screw 44. Fixed in a lug 45 which projects from one side of the bracket is a screw 46 on which is threaded a narrowed nut 47 disposed between ears 48 and 49 projecting from a clamp 50 slidably mounted on the pedestal 35 but capable of being locked in adjusted position by means of a screw 51.

Bracket 40 includes a horizontal sleeve portion 52 which is horizontally split at its outer side and has parallel ears as at 53 connected by a clamping screw 54. A rod 55, slidably disposed in the sleeve 52, may be clamped in longitudinally adjusted position by screw 54 and is restrained against relative rotation by a key or spline 56.

A clamp 57 slidably mounted on the rod 55 may be held against longitudinal movement with respect thereto by a clamping screw 58. The clamp has a pair of apertured lugs 59, 60, between which a relatively thin nut 61 is disposed, in threaded relation upon a screw 62, extending through the apertures in the lugs and held fixedly at its forward end in a block 63 projecting horizontally from the sleeve portion 52 of bracket 40. When the clamp 57 is firmly attached to the rod 55 and the screw 54 loosened somewhat, the longitudinal position of the rod 55 may be shifted with fine accuracy by manipulating the nut 61, in one direction or the other.

Similarly, the vertical position of the bracket 40 on pedestal 35 may be nicely adjusted by the nut 47 engaging screw 46, when the upper clamp 50 is tight on the pedestals and screw 44, associated with bracket 40 has been temporarily loosened.

The squared forward end 65 of the rod 55 carries a block 66, to the sides of which a pair of flat steel springs 67, 68 are attached by suitable screws or the like. The forward ends of the springs are recessed or apertured as at 69 for the reception of hardened steel ball bearings 70, seated in recesses 71 (Figure 6) formed in the side faces of a central block 72 of a lever 73. The block 72 of the lever carries laterally projecting, upper and lower pins 74, 75, adapted to be selectively engaged by a spring wire 76, having its rear end secured by screw 77. The spring 76 urges the upper end of the lever rearwardly as indicated in full lines in Figure 1 when engaged under the lower pin 75, or forwardly, as shown in broken lines when engaged above the upper pin 74.

The block 66 has a vertical bore adjacent its forward end, through which the shank of a cap screw or bolt 78 extends, into a threaded bore in the squared end 65 of rod 55. A screw 79 has its lower end adjustably threaded in a bore in the block 66 and its upper end threaded into the base of a dial indicator gauge 80, the parts being locked in adjusted position by nuts 79a and 79b. The gauge 80 has an operating button 81, positioned to be engaged by the upper end 82 of lever 73. The lower end 83 of the lever 73 carries a hardened steel contact piece 84, adapted to engage the work piece 85 as hereinafter explained.

In the use of the apparatus, for instance, when it is desired to produce on the lathe a plurality of identical articles, the first article is turned down in the conventional manner, by employing calipers or gauges from time to time as the work progresses, stopping the machine periodically to make the necessary measurements. When the product has been completed, it may be left in the chuck, and the gauging apparatus of the present invention installed, for instance, by placing the lower end of the pedestal 35 in socket 28, or, if already there, by rotating the pedestal to bring rib 38 into notch 34. The vertical position of the bracket 40 may be adjusted by the knurled nut 47, and the longitudinal position of rod 55 and the parts carried thereby similarly adjusted by the knurled nut 61. When the parts have been adjusted, the contact piece 84 is in engagement with the work and the upper end of the lever 82 is in such engagement with the button 81 of the dial indicator that the needle thereof registers zero. The screws 44 and 54 may be tightened to clamp the parts in this position. The lower end of the lever 73 may now be swung rearwardly to the broken line position of Figure 1, by shifting the spring wire 76 into engagement with the upper pin 74, and the work piece 85 removed from the chuck, a half section of which is shown at 86. After a new piece of stock has been put in place, the lathe may operate continuously and automatically, with the lower end 84 of the lever 73 in engagement with the work, under the influence of the spring 76, now positioned below the lower pin 75. The operation of the lathe continues until the upper end of the lever 73 engages the button 81 of the dial indicator and shifts the same sufficiently to cause the needle thereof to register zero, at which point the operation of the lathe is stopped and the completed piece removed.

To avoid excessive wear on the tip 84, the spring 76 may be placed over pin 74, so that the lever 73 assumes the position shown in broken lines in Figure 1. To take readings of the indicator from time to time, the lower end of the lever may be pushed manually against the work piece, and then returned to the retracted position.

These operations may be repeated any number of times to produce identical products. Hence, accurate gauging of the work is possible during the progress of the operation of the machine, and stoppages for measuring purposes are unnecessary.

The invention contemplates mounting a plurality of additional sockets for the pedestal 35 or the like at various other places on the lathe, to the end that the position of the gauging apparatus may be shifted from place to place and from machine to machine, as occasion may dictate. For instance, as shown in dotted lines in Figure 1, a socket 28' having apertured lugs 29' may be bolted to the far side face of the cross-slide 22, for supporting the pedestal of a gauging assembly for transverse movement with the slide, to gauge the flatness and trueness of radial surfaces on the work.

Referring to Figures 6, 7, and 8, the central block 72 of the lever 73 has an aperture 88 in its front face, adapted to receive the rear end of a feeler arm 89, having a hardened end 90, which may be used to measure the interior bore of a hollow work piece 91 or the like, the arm being urged downwardly into contact with said surface by the spring 76, positioned above the upper pin 74. If desired, a contactor arm 92 (Figure 8) having a bent end 93 may be substituted for the arm 89. Both types of arm preferably have a split end 94, adapted to be received with a snug frictional fit within the bore 88.

In the modification shown in Figure 9, the block 96 has a threaded aperture 97 for the reception of the threaded section 98 of the supporting stem 99 of a dial indicator 100. The block 96 is secured upon the square end 65 of the rod 55 by a screw 101, extending upwardly through a bore in the block and threaded into a central bore in the lower end face of the stem 99.

In this case the central block portion 102 of the contact lever 103 is adapted to engage vertical and inclined surfaces 104, 105 formed on the end face of the block 96, to limit the swinging movement of the lever, under the influence of a shiftable weight 106, having a sleeve portion 107 embracing the cylindrical portion 108 of the upper end of the lever. The undersurface of the sleeve portion 107 of the weight is provided with a radial V-shaped rib 109, adapted to seat in a correspondingly shaped groove in the upper face of the enlarged lower section 110 of the upper arm of the lever. A spring 111, interposed between the sleeve portion 107 of the weight and a collar 112, urges the weight downwardly. When in the position shown in full lines in Figure 9, the weight tends to pivot the upper end of the lever to the right, toward engagement with the button of the dial indicator, whereas, when rotated to the dotted line position, the weight swings the lever in a counterclockwise direction until the central block 102 comes into engagement with the surface 105. The main purpose of swinging the rear end of the lever rearwardly in all cases is to get it out of the way, when installing a new blank or work piece or when removing a finished product.

In the form of the invention shown in Figure 10, a socket member 110 for a pedestal 111, generally similar to the pedestal 35, previously described, has a base flange 112 which is apertured to receive a screw 113 having an enlarged head 114 disposed in a T-shaped slot 115, formed in the saddle member 116. A spring pressed ball 117, associated with one wall of the socket 110 is adapted to be seated in a circumferential groove 118, adjacent the lower end of the pedestal 111, to maintain the pedestal in the socket against accidental removal, but permitting deliberate withdrawal.

A second socket member 120, provided with a vertically extending slit 121 and a clamping screw 122 may be formed as an integral part of the understrip 123 of the carriage 116. The pedestal 111 may be selectively positioned in the socket 110 or 120, depending upon the character of the work to be gauged.

The position of the socket 110 may obviously be shifted by loosening the nut 112' on the screw 112 and sliding the assembly longitudinally with respect to the T-slot 115 to the desired position, whereupon the nut may be tightened to clamp the parts in position.

The arrangement shown in Figure 11 includes a base or bridge member 125, having a plurality of split sockets 126, 127, 128 formed integrally therewith and each provided with a clamping screw 129 extending through laterally projecting, apertured lugs, as previously described. The bridge or base 125 straddles the cross-slide 22 and is secured to the lathe carriage or saddle 23 above the rear portion 24 thereof, by bolts 132 and 133. The pedestal or post 134, similar to the posts 35 and 111 may be mounted in either of the sockets 126, 127, or 128, depending upon the character of and the position of the work to be gauged and other factors. Thus, the invention contemplates mounting the gauging apparatus as shown in Figures 1 and 10, or directly on the lathe carriage, straddling the cross-slide, behind the cutting tools.

In Figure 12 the base or bridge 135 is adapted to be mounted in the same manner as in Figure 11, but in this case, the bridge is provided with a T-slot 136, adapted to receive the enlarged head 137 formed below the lower threaded end 138 of a measuring instrument supporting pedestal 139, corresponding generally to the pedestals previously described. A clamping nut 140, threaded on the section 138 clamps the parts in the desired adjusted relation, at various points along the slot 136.

In Figure 13, a base block 145 may be secured to a saddle member, for instance, the member 24 of Figure 1, by a securing screw 146, and its position accurately fixed by four squaring screws 147, as previously described in connection with Figure 1. The base block 145 carries a channel member 148, of suitable length, having an upwardly opening T-shaped slot 149 formed therein, to receive the enlarged head 150 of a pedestal 151, similar to those previously described, and adapted to be clamped in longitudinally adjusted position by a nut 152, screwed on the threaded section 153 of the pedestal.

In Figure 14 the gauging assembly is mounted upon an independent slide 160, movable longitudinally of the lathe between the head stock and the tail stock, on ways 161 and 162. The undersurface of the slide is provided with a V-shaped groove 163, mating with a similarly shaped rib 164 associated with one of the ways, as is well-understood. The slide 160 is provided with an upwardly opening T-shaped slot 165, extending transversely of the lathe, in which the lower end of a pedestal 166 may be slidably disposed. As previously described, the pedestal includes an enlarged head 167, mounted for longitudinal movement with respect to the slot and a clamping nut 168, screwed on the threaded lower section 169 of the pedestal.

The operation of the various modifications shown in Figures 11–14 will be substantially the same as that previously described, since these arrangements are provided simply to increase the flexibility of use of the invention and to make possible a great plurality of different adjustable mountings for the gauging or measuring apparatus.

It should be understood that the invention is not limited to the type of indicator assembly shown mounted on the block 65 in Figures 1, 4, and 7, since indicators of other types, made by various manufacturers may be supported, by suitable devices, upon the adjustable arm or block of the present invention. The attachment is so constructed and arranged that it can be transferred from one socket or the like for longitudinal travel to another socket for transverse travel regardless of the detailed construction of the various parts.

The invention is not limited to the details of construction shown in the accompanying drawings and described above, but includes all modifications coming within the scope of the appended claims and their equivalents.

I claim:

1. An attachment for lathes including a saddle adapted to travel on the ways of the lathe, a vertical socket member carried by the saddle, a pedestal mounted in said socket member, a bracket on said pedestal and adjustable longitudinally thereof, means for locking the bracket in adjusted position, a horizontal arm supported by the bracket and adjustable longitudinally relative thereto, means for locking said arm in adjusted position, a gauge supported by one end of said arm and having a push-pin positioned above and faced in the same direction as said arm end, a two armed lever pivotally supported by said arm end on a horizontal axis in a vertical plane which is perpendicular to the arm axis, the arrangement being such that one end of said lever is engageable with said push-pin to operate the gauge when the other end of the lever contacts the work, a collar on said pedestal, and a screw threaded in the collar and adjustable to lock the collar to the pedestal in a selected angular relation thereto, there being a tapered tongue and groove coupling between the collar and the top of the socket member, said coupling normally holding the pedestal against turning but being disengageable by abnormal turning force.

2. An attachment for lathes as called for in claim 1 wherein stop means is provided limiting swinging of said lever end away from the push-pin, and including spring means acting selectively to swing the lever into engagement with the push-pin or into engagement with the stop means.

3. In combination with a lathe, and an attachment including a pedestal, means for adjustably connecting the pedestal to one side of the lathe, a bracket on said pedestal and adjustable longitudinally thereof, means for locking the bracket in adjusted position, an arm supported by the bracket for longitudinal adjustment relative to the bracket in a plane perpendicular to the pedestal, means for locking the arm in adjusted position, a block fixed on one end of said arm, a gauge supported by the block thereabove and having a push-pin positioned above and faced in the same direction as said arm end, a pair of parallel arms projecting from said block, a lever pivoted at its central portion between said arms, the arrangement being such that one end of said lever is engageable with said push-pin to operate the gauge, said block including a stop portion engageable by the lever to limit swinging movement of said lever away from the push-pin, and spring means acting selectively to swing the lever into engagement with the push-pin or in engagement with said stop portion.

THEODORE O. STRAUSS.

References Cited in the file of this patent

UNITED STATES PATENTS

| Number | Name | Date |
|---|---|---|
| 496,272 | Mieback | Apr. 25, 1893 |
| 791,283 | Nichols | May 30, 1905 |
| 968,884 | Reisner et al. | Aug. 30, 1910 |
| 1,047,511 | Freeman | Dec. 17, 1912 |
| 1,093,027 | Berg et al. | Apr. 14, 1914 |
| 1,322,302 | Knab | Nov. 18, 1919 |
| 1,413,232 | Miolla | Apr. 18, 1922 |
| 1,571,641 | Pratt | Feb. 2, 1926 |
| 1,688,096 | Tesk | Oct. 16, 1928 |
| 2,073,089 | Autenrieth | Mar. 9, 1937 |
| 2,098,838 | Rusnak | Nov. 9, 1937 |
| 2,124,006 | Parker | July 19, 1938 |
| 2,242,151 | Sisson | May 13, 1941 |
| 2,258,175 | Coleman | Oct. 7, 1941 |
| 2,296,707 | Croston | Sept. 22, 1942 |
| 2,302,090 | Aller | Nov. 17, 1942 |

FOREIGN PATENTS

| Number | Country | Date |
|---|---|---|
| 379,777 | Germany | Aug. 30, 1923 |
| 890,199 | France | Nov. 2, 1943 |